United States Patent
Lee et al.

(10) Patent No.: US 9,374,602 B2
(45) Date of Patent: Jun. 21, 2016

(54) METHOD AND APPARATUS FOR ENTROPY-CODING/ENTROPY-DECODING VIDEO DATA USING DIFFERENT BINARIZATION METHODS

(75) Inventors: Yung-Lyul Lee, Seoul (KR); Dae-yeon Kim, Seoul (KR)

(73) Assignees: SAMSUNG ELECTRONICS CO., LTD., Suwon-si (KR); INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 1461 days.

(21) Appl. No.: 12/108,697

(22) Filed: Apr. 24, 2008

(65) Prior Publication Data

US 2008/0310503 A1   Dec. 18, 2008

(30) Foreign Application Priority Data

Jun. 14, 2007   (KR) .................. 10-2007-0058579

(51) Int. Cl.
H04N 19/61        (2014.01)
H04N 19/91        (2014.01)

(52) U.S. Cl.
CPC .............. H04N 19/91 (2014.11); H04N 19/61 (2014.11)

(58) Field of Classification Search
CPC ................................................. H04N 7/26244
USPC ........................................................ 375/240.2
See application file for complete search history.

(56) References Cited

U.S. PATENT DOCUMENTS

| | | | |
|---|---|---|---|
| 6,879,268 B2 | 4/2005 | Karczewicz | |
| 7,680,346 B2 | 3/2010 | Han | |
| 7,817,864 B2 | 10/2010 | Chiba et al. | |
| 2004/0131272 A1* | 7/2004 | Kobayashi et al. | 382/247 |
| 2004/0150540 A1* | 8/2004 | Winger | H04N 19/60 341/107 |
| 2005/0036551 A1 | 2/2005 | Winger et al. | |
| 2005/0038837 A1* | 2/2005 | Marpe | H03M 7/40 708/200 |
| 2005/0169374 A1 | 8/2005 | Marpe et al. | |
| 2005/0201629 A1 | 9/2005 | Karczewicz et al. | |
| 2006/0017592 A1 | 1/2006 | Shim et al. | |

(Continued)

FOREIGN PATENT DOCUMENTS

| | | |
|---|---|---|
| CN | 1953552 A | 4/2007 |
| JP | 2007-116436 A | 5/2007 |

(Continued)

OTHER PUBLICATIONS

European Search Report issued on Nov. 8, 2010 in the corresponding European Patent Application No. 08741496.7.

(Continued)

Primary Examiner — Sath V Perungavoor
Assistant Examiner — James Pontius
(74) Attorney, Agent, or Firm — Sughrue Mion, PLLC

(57) ABSTRACT

Provided are a method and apparatus for entropy-encoding/entropy-decoding video data. The method of entropy-encoding video data includes binarizing coefficients of the frequency domain, which are generated by transforming a residual block of a current block into the frequency domain, using different binarization methods and performing binary arithmetic coding on the binarized coefficients. In this way, the coefficients are binarized adaptively according to whether the frequencies of the coefficients are high or low, thereby improving the compression efficiency of the video data.

8 Claims, 10 Drawing Sheets

| A GROUP || B GROUP || C GROUP ||
|---|---|---|---|---|---|
| abs_level | Bin string | abs_level | Bin string | abs_level | Bin string |
| 1 | 0 | 1 | 0 | 1 | 0 |
| 2 | 10 | 2 | 10 | 2 | 10 |
| 3 | 110 | 3 | 110 | 3 | 110 |
| 4 | 1110 | 4 | 1110 | 4 | 1110 |
| 5 | 11110 | 5 | 11110 | 5 | 11110 |
| 6 | 111110 | 6 | 111110 | 6 | 111110 |
| 7 | 1111110 | 7 | 1111110 | 7 | 1111110 |
| 8 | 1111111000 | 8 | 11111110 | 8 | 11111110 |
| 9 | 1111111001 | 9 | 111111100 | 9 | 111111110 |
| 10 | 1111111010 | 10 | 111111101 | 10 | 1111111110 |
| 11 | 1111111011 | 11 | 111111111000 | 11 | 111111111100 |
| 12 | 111111110000 | 12 | 111111111001 | 12 | 111111111101 |
| 13 | 111111110001 | 13 | 111111111010 | 13 | 1111111111000 |
| 14 | 111111110010 | 14 | 111111111011 | 14 | 1111111111001 |
| 15 | 111111110011 | 15 | 11111111110000 | 15 | 1111111111010 |
| 16 | 111111110100 | 16 | 11111111110001 | 16 | 1111111111011 |
| 17 | 111111110101 | 17 | 11111111110010 | 17 | 111111111110000 |
| 18 | 111111110110 | 18 | 11111111110011 | 18 | 111111111110001 |
| 19 | 111111110111 | 19 | 11111111110100 | 19 | 111111111110010 |
| ⋮ | ⋮ | ⋮ | ⋮ | ⋮ | ⋮ |

(56) References Cited

U.S. PATENT DOCUMENTS

| | | | |
|---|---|---|---|
| 2006/0171465 | A1 | 8/2006 | Thyagarajan |
| 2006/0280371 | A1 | 12/2006 | Shimazaki et al. |
| 2007/0041449 | A1 | 2/2007 | Bjontegaard et al. |
| 2007/0092150 | A1 | 4/2007 | Chiba et al. |
| 2007/0110153 | A1 | 5/2007 | Cho et al. |
| 2007/0171985 | A1 | 7/2007 | Kim et al. |
| 2008/0310503 | A1* | 12/2008 | Lee ................ H04N 19/91 375/240.2 |

FOREIGN PATENT DOCUMENTS

| | | |
|---|---|---|
| KR | 10-2006-0007786 A | 1/2006 |
| KR | 10-2007-0011789 A | 1/2007 |
| KR | 1020070011789 A | 1/2007 |
| KR | 10-2007-0052057 A | 5/2007 |

OTHER PUBLICATIONS

Chinese Office Action issued Jul. 20, 2011 in counterpart Chinese Application No. 200880020191.0.

Communication dated Jun. 18, 2012 issued State Intellectual Property Office of P.R. China in counterpart Chinese Patent Application No. 200880020191.0.

Communication dated Dec. 25, 2012, issued by the State Intellectual Property Office of People's Republic China in counterpart Chinese Patent Application No. 200880020191.0.

Communication, dated Nov. 27, 2013, issued by the Korean Intellectual Property Office, in counterpart Application No. 10-2007-0058579.

Communication dated May 8, 2014 from the Korean Intellectual Property Office in a counterpart Korean application No. 10-2007-0058579.

Marpe, et al., "Context-Based Adaptive Binary Arithmetic Coding in the H.264/AVC Video Compression Standard", IEEE Transactions on Circuits and Systems for Video Technology, vol. X, No. Y, Month 2003, total 18 pages.

Communication dated Sep. 29, 2014, issued by the State Intellectual Property Office of P.R. China in counterpart Chinese Application No. 200880020191.0.

Communication dated Jan. 16, 2015 issued by the Korean Intellectual Property Office in counterpart Application No. 10-2014-0169973.

Communication from the Korean Intellectual Property Office dated Apr. 24, 2015 in a counterpart Korean application No. 10-2007-0058579.

Communication from the Korean Intellectual Property Office dated Apr. 24, 2015 in a counterpart Korean application No. 10-2014-0169973.

Communication issued on Jan. 31, 2016 by the Korean Intellectual Property Office in related Application No. 10-2015-0165578.

"Advanced video coding for generic audiovisual services", ITU-T Telecommunication Standardization Sector of ITU, H.264, Series H: Audiovisual and Multimedia Systems Infrastructure of audiovisual services—Coding of moving video, Mar. 2005, 341 total pages.

* cited by examiner

FIG. 2
PRIOR ART

| abs_level | Bin string | |
| --- | --- | --- |
| | Truncated Unary | $0^{th}$ order Exp-Golomb |
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 1111111110 | |
| 11 | 11111111110 | |
| 12 | 111111111110 | |
| 13 | 1111111111110 | |
| 14 | 11111111111110 | |
| 15 | 111111111111111 | 0 |
| 16 | 111111111111111 | 100 |
| 17 | 111111111111111 | 101 |
| 18 | 111111111111111 | 11000 |
| 19 | 111111111111111 | 11010 |
| ⋮ | ⋮ | ⋮ |

FIG. 5

| A | A | B | C |
|---|---|---|---|
| A | B | C | D |
| B | C | D | D |
| C | D | D | D |

FIG. 6

| A GROUP | | B GROUP | | C GROUP | |
|---|---|---|---|---|---|
| abs_level | Bin string | abs_level | Bin string | abs_level | Bin string |
| 1 | 0 | 1 | 0 | 1 | 0 |
| 2 | 10 | 2 | 10 | 2 | 10 |
| 3 | 110 | 3 | 110 | 3 | 110 |
| 4 | 1110 | 4 | 1110 | 4 | 1110 |
| 5 | 11110 | 5 | 11110 | 5 | 11110 |
| 6 | 111110 | 6 | 111110 | 6 | 111110 |
| 7 | 1111110 | 7 | 1111110 | 7 | 1111110 |
| 8 | 1111111000 | 8 | 11111110 | 8 | 11111110 |
| 9 | 1111111001 | 9 | 1111111100 | 9 | 111111110 |
| 10 | 1111111010 | 10 | 1111111101 | 10 | 1111111110 |
| 11 | 1111111011 | 11 | 111111111000 | 11 | 111111111100 |
| 12 | 111111110000 | 12 | 111111111001 | 12 | 111111111101 |
| 13 | 111111110001 | 13 | 111111111010 | 13 | 11111111111000 |
| 14 | 111111110010 | 14 | 111111111011 | 14 | 11111111111001 |
| 15 | 111111110011 | 15 | 11111111110000 | 15 | 11111111111010 |
| 16 | 111111110100 | 16 | 11111111110001 | 16 | 11111111111011 |
| 17 | 111111110101 | 17 | 11111111110010 | 17 | 1111111111110000 |
| 18 | 111111110110 | 18 | 11111111110011 | 18 | 1111111111110001 |
| 19 | 111111110111 | 19 | 11111111110100 | 19 | 1111111111110010 |
| ⋮ | ⋮ | ⋮ | ⋮ | ⋮ | ⋮ |

FIG. 7

| QP \ GROUP | 0 ~ 4 | 5 ~ 10 | 11 ~ 16 | 17 ~ 22 | 23 ~ 28 | 28 ~ |
|---|---|---|---|---|---|---|
| A | T=3, k=3 | T=6, k=3 | T=7, k=2 | T=7, k=2 | T=8, k=1 | T=14, k=0 |
| B | T=5, k=2 | T=7, k=2 | T=7, k=2 | T=8, k=1 | T=8, k=1 | T=14, k=0 |
| C | T=8, k=1 | T=8, k=1 | T=8, k=1 | T=10, k=1 | T=10, k=1 | T=14, k=0 |

METHOD AND APPARATUS FOR ENTROPY-CODING/ENTROPY-DECODING VIDEO DATA USING DIFFERENT BINARIZATION METHODS

CROSS-REFERENCE TO RELATED PATENT APPLICATION

This application claims priority from Korean Patent Application No. 10-2007-0058579, filed on Jun. 14, 2007, in the Korean Intellectual Property Office, the disclosure of which is incorporated herein in its entirety by reference.

BACKGROUND OF THE INVENTION

1. Field of the Invention

The present invention generally relates to a method and apparatus for entropy-coding/entropy-decoding video data, and more particularly, to a method and apparatus for entropy-coding/entropy-decoding video data by efficiently binarizing discrete cosine transform (DCT) coefficients of a residual block of a current block.

2. Description of the Related Art

In video compression standards, such as moving picture expert group (MPEG)-1, MPEG-2, and H.264/MPEG-4 advanced video coding (AVC), a picture is divided into predetermined units of video processing, e.g., macroblocks, for video encoding. Each of the macroblocks is then encoded using interprediction or intraprediction. Next, an optimal encoding mode is selected based on the size of data of the encoded macroblock and the degree of distortion between the encoded macroblock and the original macroblock and the macroblock is encoded in the selected encoding mode, as will now be described in detail with reference to FIG. 1.

FIG. 1 is a block diagram of a video encoder 100 according to the related art.

Referring to FIG. 1, a motion compensation unit 104 or an intraprediction unit 106 performs interprediction or intraprediction in block units. The motion compensation unit 104 performs interprediction on the current block based on a motion vector of the current block that is estimated by a motion estimation unit 102, by searching for a reference picture stored in a frame memory 120. The intraprediction unit 106 performs intraprediction on the current block using pixels included in a previously encoded region of the current picture.

A prediction block that is a prediction value for the current block generated as a prediction result is subtracted from the original block, thereby generating a residual block. The generated residual block is transformed into the frequency domain by a transformation unit 108. The transformation unit 108 also performs discrete cosine transformation (DCT), thereby generating coefficients in the frequency domain for the residual block, i.e., DCT coefficients. A quantization unit 110 quantizes the DCT coefficients. The quantized coefficients are entropy-coded by an entropy-coding unit 112 and then inserted into a bitstream.

The coefficients quantized by the quantization unit 110 are inversely quantized by an inverse quantization unit 114 and an inverse transformation unit 116 performs inverse discrete cosine transformation (IDCT) on the inversely quantized coefficients. The residual block reconstructed by the IDCT is added to the prediction block, thereby reconstructing the original block.

The reconstructed original block is deblocking-filtered by a filtering unit 118 and then stored in the frame memory 120 in order to be used for interprediction or intraprediction of another block.

In H.264/AVC coding, entropy-coding is performed by using context-adaptive variable length coding (CAVLC) or context-adaptive binary arithmetic coding (CABAC). Entropy-coding is performed by applying different entropy-coding methods to different syntax elements.

Among a variety of syntax elements, DCT coefficients are CAVLC-coded by run-level coding. A DCT coefficient having a value of '0' is called a 'run' and DCT coefficients having values other than '0' are called a 'level'. The DCT coefficients are binarized separately for 'runs' and 'levels' and bin strings generated by the binarization are arithmetically coded using a context model.

The DCT coefficients having values other than '0', i.e., the levels, are binarized into variable-length codes using concatenated unary/$k^{th}$ order exponential Golomb binarization and then bin strings generated by the binarization are arithmetically coded, as will now be described in detail with reference to FIG. 2.

Referring to FIG. 2, levels are binarized using a binarization method that is a combination of truncated unary binarization having a maximum code value (cMax) of '14' and 0th order exponential Golomb binarization.

A level having a value (abs_level)<=14 is binarized using only truncated unary binarization and a level having a value >14 is binarized using a combination of truncated unary binarization and exponential Golomb binarization.

However, in the probability distribution of DCT coefficients, levels are concentrated in coefficients of a low-frequency component and runs are concentrated in coefficients of a high-frequency component. In other words, levels are concentrated in an upper left portion of a DCT coefficient block generated by performing DCT on a residual block and runs are concentrated in a lower right portion of the DCT coefficient block. Therefore, it is inefficient to apply the same binarization method as illustrated in FIG. 2 to DCT coefficients because the DCT coefficients are binarized without consideration of the probability distribution of runs and levels.

SUMMARY OF THE INVENTION

The present invention provides a method and apparatus for efficiently entropy-coding/entropy-decoding video data by considering the probability distribution of discrete cosine transform (DCT) coefficients, and a computer-readable recording medium having recorded thereon a program for executing the method.

According to one aspect of the present invention, there is provided a method of entropy-coding video data. The method includes binarizing coefficients of a frequency domain, which are generated by transforming a residual block of a current block into the frequency domain, using different binarization methods and performing binary arithmetic coding on the binarized coefficients.

The coefficients of the frequency domain may be discrete cosine transformation (DCT) coefficients generated by performing DCT on the residual block.

The binarization of the coefficients may include grouping the DCT coefficients generated by performing the DCT into a plurality of groups based on whether frequencies of the DCT coefficients are high or low and binarizing the DCT coefficients by applying different binarization methods to the plurality of groups.

The binarization of the coefficients may include binarizing the DCT coefficients using different concatenated unary/$k^{th}$ order exponential Golomb binarization method based on whether the frequencies of the DCT coefficients are high or low.

According to another aspect of the present invention, there is provided a video encoding method including generating a prediction block that is a prediction value for a current block and subtracting the generated prediction block from the current block, thereby generating a residual block of the current block, generating discrete cosine transformation (DCT) coefficients for the residual block by performing DCT on the generated residual block and quantizing the generated DCT coefficients, and grouping the quantized DCT coefficients into a plurality of groups based on whether frequencies of the DCT coefficients are high or low, binarizing the DCT coefficients by applying different binarization methods to the plurality of groups, and performing binary arithmetic coding on the binarized coefficients.

According to another aspect of the present invention, there is provided an apparatus for entropy-coding video data. The apparatus includes a binarization unit that binarizes coefficients of a frequency domain, which are generated by transforming a residual block of a current block into the frequency domain, using different binarization methods and a binary arithmetic coding unit that performs binary arithmetic coding on the binarized coefficients.

According to another aspect of the present invention, there is provided a video encoding apparatus including a residue generation unit, a transformation unit, a quantization unit, and an entropy-coding unit. The residue generation unit generates a prediction block that is a prediction value for a current block and subtracts the generated prediction block from the current block, thereby generating a residual block of the current block. The transformation unit generates discrete cosine transformation (DCT) coefficients for the residual block by performing DCT on the generated residual block. The quantization unit quantizes the generated DCT coefficients. The entropy-coding unit groups the quantized DCT coefficients into a plurality of groups based on whether frequencies of the DCT coefficients are high or low, binarizes the DCT coefficients by applying different binarization methods to the plurality of groups, and performs binary arithmetic coding on the binarized coefficients.

According to another aspect of the present invention, there is provided a method of entropy-decoding video data. The method includes receiving data regarding a residual block which is generated by binarizing coefficients of a frequency domain generated by transforming the residual block of a current block into a frequency domain by using different binarization methods and then performing binary arithmetic coding on the binarized coefficients and performing binary arithmetic decoding on the received data, thereby generating the binarized coefficients, and inversely binarizing the binarized coefficients using different inverse binarization methods.

According to another aspect of the present invention, there is provided a video decoding method including generating binarized discrete cosine transformation (DCT) coefficients by performing binary arithmetic decoding on data regarding a residual block which is generated by performing entropy-coding on the residual block of a current block, grouping the binarized DCT coefficients into a plurality of groups based on whether frequencies of the DCT coefficients are high or low, and inversely binarizing the DCT coefficients by applying different inverse binarization methods to the plurality of groups, performing inverse quantization on the inversely binarized DCT coefficients and performing inverse DCT on the inversely quantized DCT coefficients, thereby reconstructing the residual block, and generating a prediction block that is a prediction value for the current block and adding the generated prediction block to the reconstructed residual block, thereby reconstructing the current block.

According to another aspect of the present invention, there is provided an apparatus for entropy-decoding video data, including an arithmetic decoding unit and an inverse binarization unit. The arithmetic decoding unit receives data regarding a residual block which is generated by binarizing coefficients of a frequency domain generated by transforming the residual block of a current block into a frequency domain using different binarization methods and then performing binary arithmetic coding on the binarized coefficients and performs binary arithmetic decoding on the received data, thereby generating the binarized coefficients. The inverse binarization unit inversely binarizes the binarized coefficients using different inverse binarization methods.

According to another aspect of the present invention, there is provided a video decoding apparatus including an entropy-decoding unit, an inverse quantization unit, an inverse transformation unit, and a reconstruction unit. The entropy-decoding unit generates binarized discrete cosine transformation (DCT) coefficients by performing binary arithmetic decoding on data regarding a residual block which is generated by performing entropy-coding on the residual block of a current block, and groups the binarized DCT coefficients into a plurality of groups based on whether frequencies of the binarized DCT coefficients are high or low, and inversely binarizes the DCT coefficients by applying different inverse binarization methods to the plurality of groups. The inverse quantization unit performs inverse quantization on the inversely quantized DCT coefficients. The inverse transformation unit performs inverse DCT on the inversely quantized DCT coefficients, thereby reconstructing the residual block. The reconstruction unit generates a prediction block that is a prediction value for the current block and adds the generated prediction block to the reconstructed residual block, thereby reconstructing the current block.

According to another aspect of the present invention, there is provided a computer-readable recording medium having recorded thereon a program for executing the method of entropy-encoding video data, the method of entropy-decoding video data, the video encoding method, and the video decoding method.

BRIEF DESCRIPTION OF THE DRAWINGS

The above and other features and advantages of the present invention will become more apparent by describing in detail exemplary embodiments thereof with reference to the attached drawings in which:

FIG. 2 illustrates a method for binarizing coefficients of a frequency domain according to the related art;

FIG. 5 illustrates grouping of DCT coefficients according to an exemplary embodiment of the present invention;

FIG. 6 is a table illustrating binarization of DCT coefficients according to an exemplary embodiment of the present invention;

FIG. 7 is a table illustrating binarization of DCT coefficients according to another exemplary embodiment of the present invention;

DETAILED DESCRIPTION OF THE INVENTION

Hereinafter, exemplary embodiments of the present invention will be described in detail with reference to the accompanying drawings.

Figure 1:
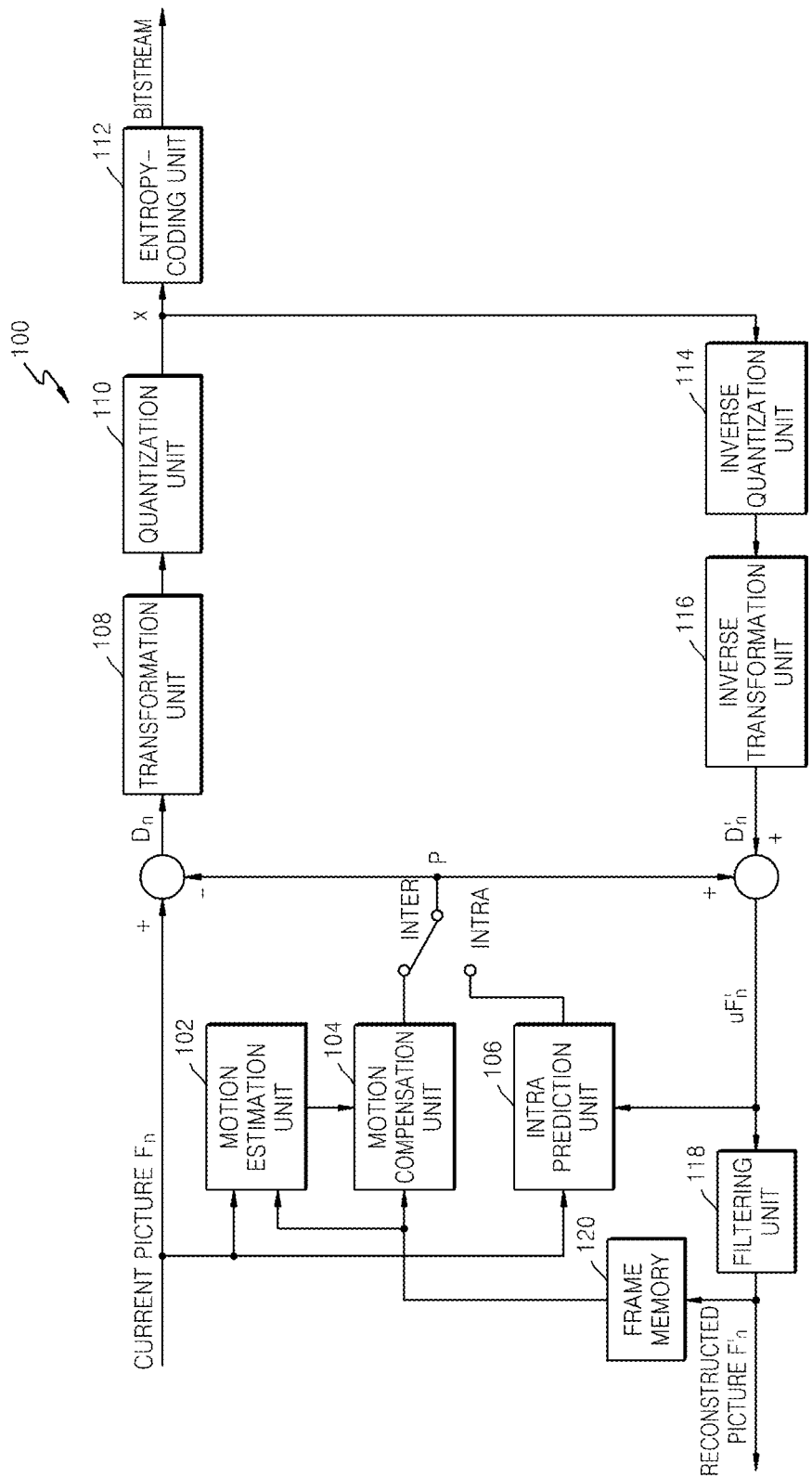
FIG. 1 is a block diagram of a video encoder according to the related art.
Figure 3:
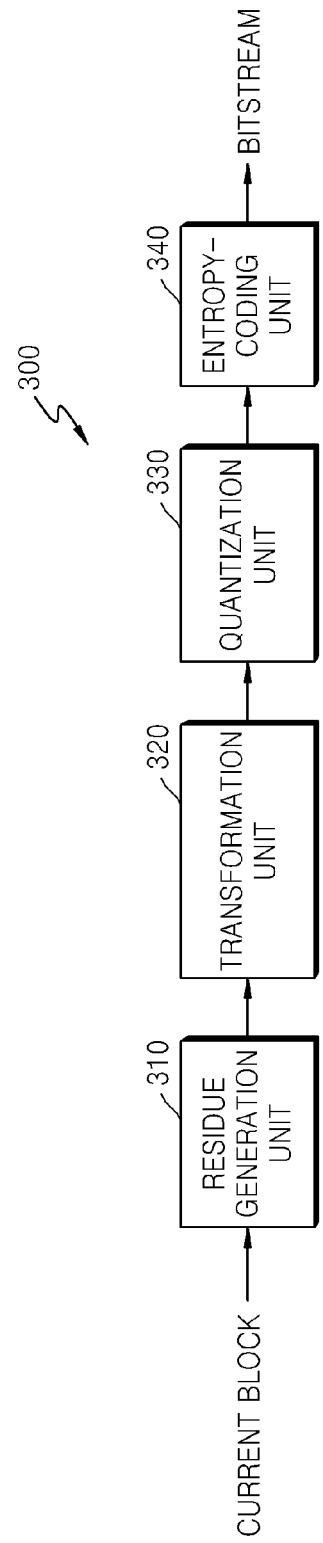
FIG. 3 is a block diagram of a video encoder according to an exemplary embodiment of the present invention.

FIG. 3 is a block diagram of a video encoder 300 according to an exemplary embodiment of the present invention.

Referring to FIG. 3, the video encoder 300 includes a residue generation unit 310, a transformation unit 320, a quantization unit 330, and an entropy-coding unit 340.

The residue generation unit 310 generates a residual block of the current block. More specifically, the residue generation unit 310 generates a prediction block that is a prediction value for the current block by performing interprediction or intraprediction and subtracts the prediction block from the current block, thereby generating the residual block.

The transformation unit 320 transforms the residual block generated by the residue generation unit 310 into the frequency domain, thereby generating coefficients of the frequency domain for the residual block. Preferably, but not necessarily, the transformation unit 320 performs discrete cosine transformation (DCT) on the residual block, thereby generating DCT coefficients. In the following description, DCT coefficients will be taken as an example of the coefficients of the frequency domain for convenience of explanation. However, it can be easily understood by those of ordinary skill in the art that the DCT coefficients are only an example of the coefficients of the frequency domain and all coefficients generated by transforming the residual block to the frequency domain fall within the scope of the present invention.

The quantization unit 330 quantizes the DCT coefficients generated by the transformation unit 320. More specifically, the quantization unit 330 quantizes the generated DCT coefficients using a predetermined quantization parameter (QP).

The entropy-coding unit 340 performs entropy-coding on the DCT coefficients quantized by the quantization unit 330. More specifically, after the quantization unit 330 re-arranges the DCT coefficients one-dimensionally by scanning the DCT coefficients, the entropy-coding unit 340 independently entropy-codes runs and levels using run-level coding. In particular, the entropy-coding unit 340 according to an exemplary embodiment of the present invention binarizes coefficients having values other than '0' from among the coefficients of the frequency domain, i.e., levels, using different binarization methods and performs binary arithmetic coding on the binarized coefficients, as will now be described in detail with reference to FIG. 4.

Figure 4:
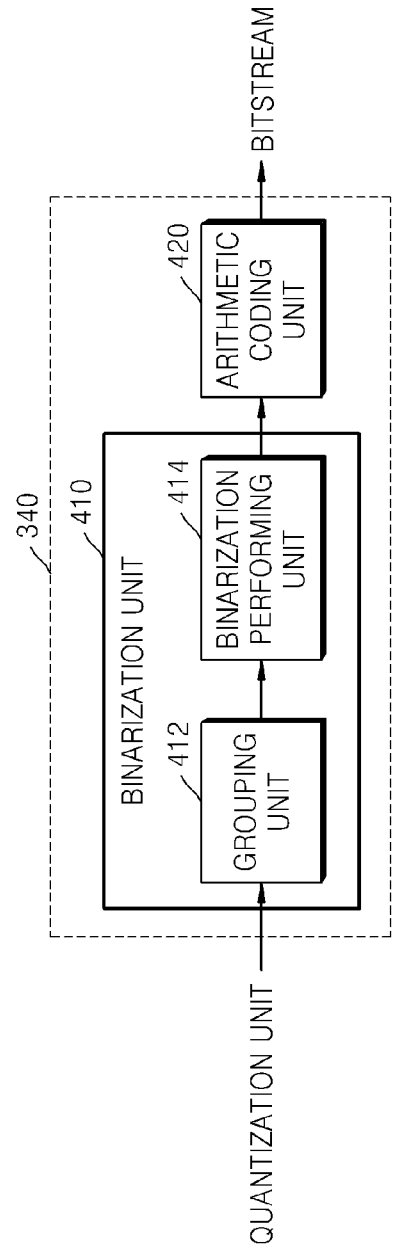
FIG. 4 is a block diagram of an entropy-coding unit according to an exemplary embodiment of the present invention.

FIG. 4 is a block diagram of the entropy-coding unit 340 according to an exemplary embodiment of the present invention.

Referring to FIG. 4, the entropy-coding unit 340 includes a binarization unit 410 and an arithmetic coding unit 420.

The binarization unit 410 receives the quantized DCT coefficients from the quantization unit 330 and binarizes some of the received DCT coefficients, which have values other than '0', by using different binarization methods.

Preferably, but not necessarily, the binarization unit 410 according to an exemplary embodiment of the present invention includes a grouping unit 412 and a binarization performing unit 414.

The grouping unit 412 divides the DCT coefficients received from the quantization unit 330 into a plurality of groups according to whether frequencies of the DCT coefficients are high or low, as will now be described in detail with reference to FIG. 5.

Figure 5:
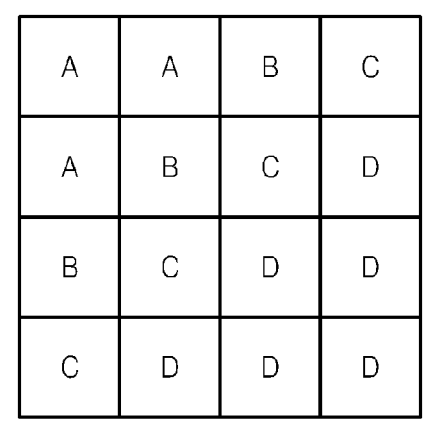

FIG. 5 illustrates grouping of the DCT coefficients according to an exemplary embodiment of the present invention. FIG. 5 illustrates a case where DCT is performed on a 4×4 block.

In a transformation coefficient block quantized by the quantization unit 330 as illustrated in FIG. 5, coefficients in an upper left portion of the transformation coefficient block are low-frequency cosine coefficients and coefficients in a lower right portion of the transformation coefficient block are high-frequency cosine coefficients. As discussed above in relation to the related art, levels are mostly located in the upper left portion of the transformation coefficient block. The levels in the upper left portion of the transformation coefficient block are likely to have greater values than those of levels located in the lower right portion of the transformation coefficient block.

Thus, the binarization unit 340 according to an exemplary embodiment of the present invention groups the DCT coefficients into a plurality of groups according to whether frequencies of the DCT coefficients are high or low in order to binarize the groups using different binarization methods. As illustrated in FIG. 5, the DCT coefficients may be grouped into groups A, B, C, and D. However, it can be easily understood by those of ordinary skill in the art that the method of grouping the DCT coefficients illustrated in FIG. 5 is only an example and the DCT coefficients can also be grouped using methods other than that illustrated in FIG. 5.

Referring back to FIG. 4, once the grouping unit 412 groups the DCT coefficients into a plurality of groups, the binarization performing unit 414 performs binarization on the plurality of groups using different binarization methods, as will now be described in detail with reference to FIG. 6.

FIG. 6 is a table illustrating binarization of DCT coefficients according to an exemplary embodiment of the present invention.

Referring to FIG. 6, among DCT coefficients included in the group A illustrated in FIG. 5, levels are binarized using a combination of truncated unary binarization having a maximum code value (cMax) of '7' and second order exponential Golomb binarization.

More specifically, levels having absolute values (abs_level), which hereinafter will be briefly referred to as values, of '1'-'7' are binarized using truncated unary binarization and levels having values greater than '7' are binarized using a combination of truncated unary binarization and exponential Golomb binarization.

Among DCT coefficients included in the group B, levels are binarized using a combination of truncated unary binarization having a maximum code value of '8' and first order exponential Golomb binarization.

More specifically, levels having values of '1'-'8' are binarized using truncated unary binarization and levels having values greater than '8' are binarized using a combination of truncated unary binarization and exponential Golomb binarization.

Among DCT coefficients included in the group C, levels are binarized using a combination of truncated unary binarization having a maximum code value of '10' and first order exponential Golomb binarization.

More specifically, levels having values of '1'-'10' are binarized using truncated unary binarization and levels having values greater than '10' are binarized using a combination of truncated unary binarization and exponential Golomb binarization.

Among DCT coefficients included in the group D (not show in FIG. 6), levels are binarized using a combination of truncated unary binarization having a maximum code value of '14' and $0^{th}$ order exponential Golomb binarization.

More specifically, levels having values of '1'-'14' are binarized using truncated unary binarization and levels having values greater than '14' are binarized using a combination of truncated unary binarization and exponential Golomb binarization.

When the DCT coefficients are binarized using different binarization methods as illustrated in FIG. 6, large values of the levels of the group A can be expressed by a small number of bin strings and small values of the levels of the group D can be expressed by a small number of bin strings.

For example, a level has a value of '19'. When an absolute value of a DCT coefficient belonging to the group A is '19', it is expressed by a total of 19 bin strings according to the related art illustrated in FIG. 2. However, according to the present invention, the absolute value is expressed by 13 bin strings. In other words, DCT coefficients of the group A, which are likely to have greater level values than those of DCT coefficients of the other groups, can be expressed by a small number of bin strings.

A binarization method may be changed by simultaneously changing a maximum code value of unary binarization and an order of exponential Golomb coding as illustrated in FIG. 6, but it may also be changed by changing only one of the maximum code value of unary binarization and the order of exponential Golomb coding.

FIG. 7 is a table illustrating binarization of DCT coefficients according to another exemplary embodiment of the present invention.

The level values and probability distribution of the DCT coefficients can also be changed according to quantization parameters (QPs). It has been experimentally proven that the probability distribution of the level values of the group A illustrated in FIG. 5 is changed with the QPs. Thus, it is necessary to change a method of binarizing the DCT coefficients based on the QPs.

Referring to FIG. 7, methods of binarizing the DCT coefficients included in the groups A, B, and C illustrated in FIG. 5 vary according to the QPs. 'T' indicates the maximum code value of unary binarization and 'k' indicates the order of exponential Golomb coding.

Among the DCT coefficients included in the group D (not shown in FIG. 7), levels are binarized using a combination of truncated unary binarization having a maximum code value of '14' and $0^{th}$ order exponential Golomb binarization like in the prior art.

Referring back to FIG. 4, the DCT coefficients binarized by the binarization performing unit 414 are delivered to the arithmetic coding unit 420. The arithmetic coding unit 420 performs context-adaptive variable length coding (CAVLC) on the binarized DCT coefficients, thereby completing entropy-coding.

Figure 8:
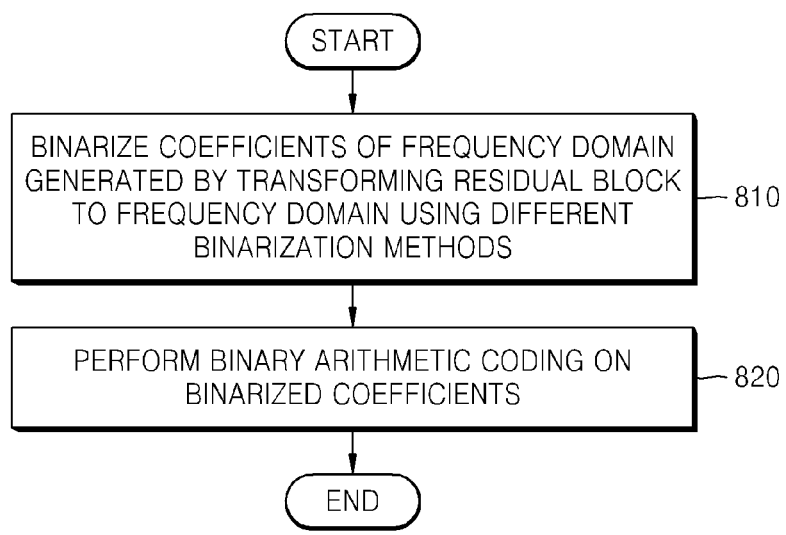
FIG. 8 is a flowchart illustrating a method of entropy-coding video data according to an exemplary embodiment of the present invention.

FIG. 8 is a flowchart illustrating a method of entropy-coding video data according to an exemplary embodiment of the present invention.

Referring to FIG. 8, the entropy-coding unit 340 according to an exemplary embodiment of the present invention binarizes DCT coefficients generated by performing DCT on a residual block of the current block, using different binarization methods, in operation 810. The entropy-coding unit 340 may group the DCT coefficients into a plurality of groups according to whether frequencies of the DCT coefficients are high or low and binarize the groups using different binarization methods. The DCT coefficients that are subject to binarization are DCT coefficients that have been quantized using a predetermined QP after having DCT performed thereon.

In operation 820, the entropy-coding unit 340 performs binary arithmetic coding on the DCT coefficients binarized in operation 810. Preferably, but not necessarily, the entropy-coding unit 340 performs CABAC. Bin strings generated by the binary arithmetic coding are inserted into a bitstream.

Figure 9:
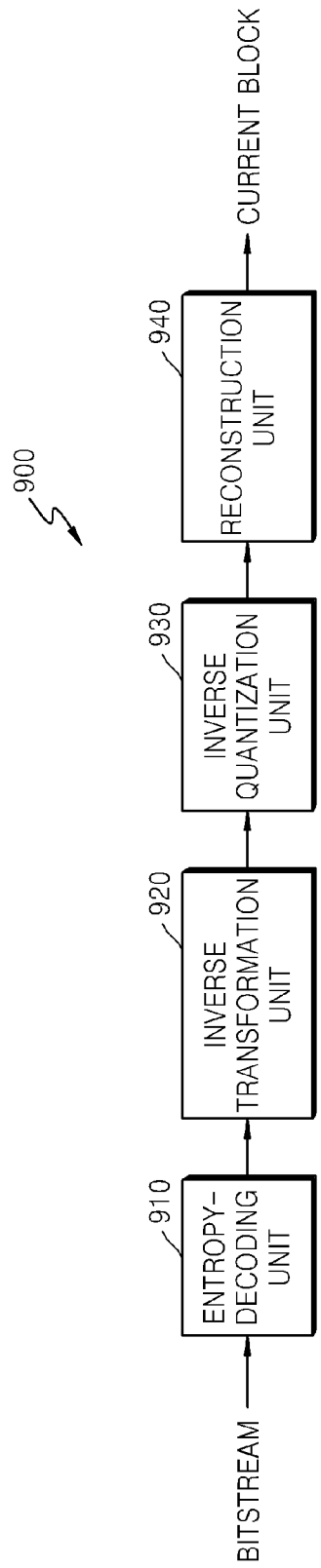
FIG. 9 is a block diagram of a video decoder according to an exemplary embodiment of the present invention.

FIG. 9 is a block diagram of a video decoder 900 according to an exemplary embodiment of the present invention.

Referring to FIG. 9, the video decoder 900 includes an entropy-decoding unit 910, an inverse transformation unit 920, and a reconstruction unit 930.

The entropy-decoding unit 910 receives a bitstream including data regarding a residual block of the current block and entropy-decodes the data regarding the residual block included in the received bitstream.

The data regarding the residual block includes DCT coefficients that have been entropy-coded by a method of entropy-coding video data according to an exemplary embodiment of the present invention. In other words, the data regarding the residual block includes data regarding DCT coefficients that are entropy-coded by binarizing DCT coefficients, generated by performing DCT on the residual block, by using different binarization methods and then binary-arithmetically coding the binarized DCT coefficients.

Figure 10:
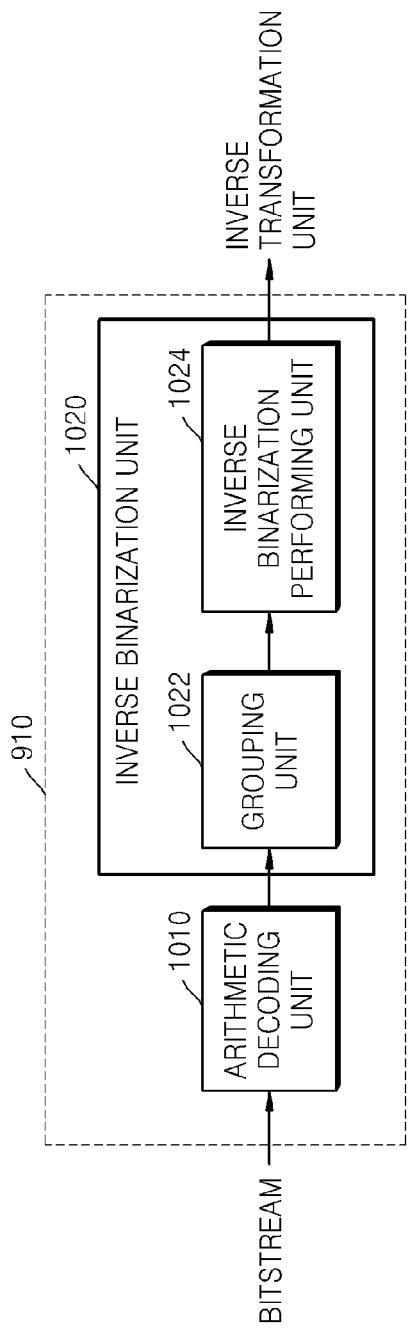
FIG. 10 is a block diagram of an entropy-decoding unit according to an exemplary embodiment of the present invention.

FIG. 10 is a block diagram of the entropy-decoding unit 910 according to an exemplary embodiment of the present invention.

Referring to FIG. 10, the entropy-decoding unit 910 includes an arithmetic decoding unit 1010 and an inverse binarization unit 1020.

The arithmetic decoding unit 1010 performs binary arithmetic decoding on the data regarding the residual block included in the bitstream. Preferably, but not necessarily, the arithmetic decoding unit 1010 performs CAVLC.

The binarized DCT coefficients are generated by binary arithmetic decoding and then delivered to the inverse binarization unit 1020.

The inverse binarization unit 1020 performs inverse binarization on the binarized DCT coefficients using different inverse binarization methods. The inverse binarization unit 1020 performs inverse binarization using inverse binarization methods corresponding to binarization methods described with reference to FIGS. 6 and 7. More specifically, the inverse binarization unit 1020 performs inverse binarization using different inverse binarization methods by considering the frequencies of the DCT coefficients and QPs.

Preferably, but not necessarily, the inverse binarization unit 1020 includes a grouping unit 1022 and an inverse binarization performing unit 1024.

The grouping unit 1022 groups the DCT coefficients that undergo binary arithmetic decoding in the arithmetic decoding unit 1010 into a plurality of groups according to whether frequencies of the DCT coefficients are high or low. As illustrated in FIG. 5, the DCT coefficients may be grouped into 4 groups.

The inverse binarization performing unit 1024 performs inverse binarization on the plurality of groups using different inverse binarization methods. More specifically, the inverse binarization performing unit 1024 performs inverse binarization on the groups using different unary binarization/exponential Golomb binarization methods. For example, the inverse binarization performing unit 1024 performs inverse binarization on coefficients having level values other than '0' from among the binarized DCT coefficients, i.e., levels. Different inverse binarization methods are applied to different groups to which the levels belong.

The inverse binarization performing unit 1024 uses different binarization methods by changing at least one of the maximum code value of unary binarization and the order of exponential Golomb binarization. In other words, the inverse binarization performing unit 1024 performs inverse binarization by applying inverse binarization methods corresponding to binarization methods applied in binarization of DCT coefficients in a video encoder to the groups.

Referring back to FIG. 9, the DCT coefficients that are entropy-decoded by being inversely binarized by the inverse binarization unit 1020 are inversely quantized by the inverse quantization unit 930. The inverse transformation unit 920 performs inverse discrete cosine transformation (IDCT) on the DCT coefficients that are inversely quantized by the inverse quantization unit 930, thereby reconstructing the residual block.

The reconstruction unit 940 generates a prediction block that is a prediction value for the current block by performing interprediction or intraprediction and adds the generated prediction block to the residual block reconstructed by the inverse transformation unit 920, thereby reconstructing the current block.

Figure 11:
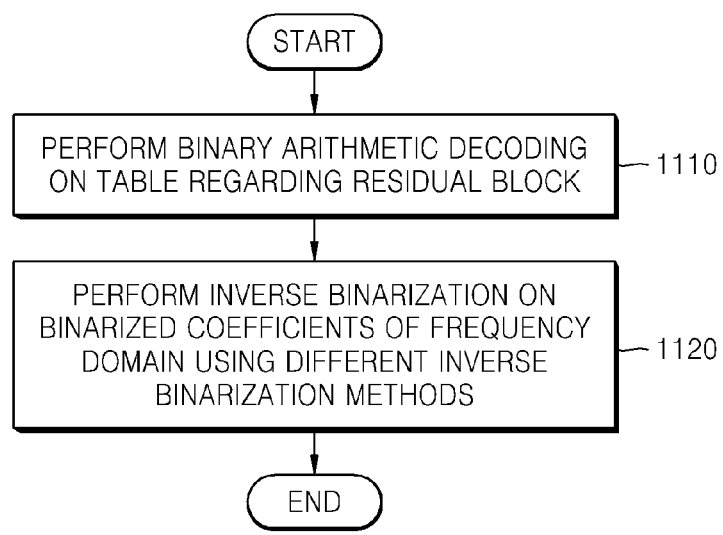
FIG. 11 is a flowchart illustrating a method of entropy-decoding video data according to an exemplary embodiment of the present invention.

FIG. 11 is a flowchart illustrating a method of entropy-decoding video data according to an exemplary embodiment of the present invention.

Referring to FIG. 11, the entropy-decoding unit 910 performs binary arithmetic decoding on data regarding a residual block in operation 1110. Preferably, but not necessarily, the entropy-decoding unit 910 performs CAVLC as mentioned above. Binarized DCT coefficients for the residual block are generated as the binary arithmetic decoding result.

In operation 1120, the entropy-decoding unit 910 performs inverse binarization on the binarized DCT coefficients by using different inverse binarization methods. In other words, the entropy-decoding unit 910 performs inverse binarization on the binarized DCT coefficients using different inverse binarization methods.

More specifically, the entropy-decoding unit 910 may group the binarized DCT coefficients into a plurality of groups according to whether frequencies of the DCT coefficients are high or low and perform inverse binarization by applying different inverse binarization methods to the groups. Among the binarized DCT coefficients, coefficients having level values other than '0', i.e., levels, are inversely binarized.

The present invention can also be embodied as computer-readable code on a computer-readable recording medium or other computer readable medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices An example of other computer readable media is carrier waves. The computer-readable recording medium can also be distributed over network coupled computer systems so that the computer-readable code is stored and executed in a distributed fashion.

According to the present invention, in entropy coding, DCT coefficients are adaptively binarized into variable length codes according to whether frequencies of the DCT coefficients are high or low and the binarized DCT coefficients are binary-arithmetically coded, thereby improving the compression efficiency of video data.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. An apparatus for entropy-coding video data, the apparatus comprising:
   a binarizer configured to binarize a coefficient of a frequency domain, which are generated by transforming a residual block of a current block into the frequency domain, using at least one from among truncated binarization method and Exponential Golomb binarization method; and
   an arithmetic coder configured to perform arithmetic coding on the binarized coefficient including a first bin string related to the truncated binarization method,
   wherein:
   when the coefficient is binarized using the truncated binarization method and the Exponential Golomb binarization method, the binarized coefficient further includes a second bin string related to a maximum code value of the truncated binarization method,
   the second bin string is related to the Exponential Golomb binarization method, and the maximum code value of the truncated binarization method varies according to a position of the coefficient in the residual block,
   when the coefficient is less than or equal to the maximum code value of the truncated binarization method, the binarized coefficient does not include the second bin string, and
   when the coefficient is greater than the maximum code value of the truncated binarization method, the binarized coefficient includes the first bin string and the second bin string.

2. The apparatus of claim 1, wherein a frequency component of the coefficient is determined according to a position of the coefficient, and
   wherein the coefficient of the frequency domain is a discrete cosine transformation (DCT) coefficient generated by performing DCT on the residual block.

3. The apparatus of claim 1, wherein the binarizer binarizes discrete cosine transformation (DCT) coefficient based on the position of the DCT coefficient.

4. The apparatus of claim 1, wherein the binarizer binarizes discrete cosine transformation (DCT) coefficient using truncated binarization method of different maximum code value from a maximum code value of another coefficient in the residual block.

5. An apparatus for entropy-decoding video data, the apparatus comprising:
   an arithmetic decoder configured to receive a bitstream including a coefficient regarding a residual block and to perform arithmetic decoding on the received bitstream to generate a binarized coefficient; and an inverse binarizer configured to inversely binarize the binarized coefficient including a first bin string related to a truncated inverse binarization method, using at least one from among the truncated inverse binarization method and an Exponential Golomb inverse binarization method to reconstruct the coefficient, wherein:

when the binarized coefficient further includes second bin string related to a maximum code value of the truncated inverse binarization method, the binarized coefficient is inversely binarized using the truncated inverse binarization method and the Exponential Golomb inverse binarization method, the second bin string is related to the Exponential Golomb inverse binarization method, and the maximum code value of the truncated inverse binarization method varies according to a position of the coefficient in the residual block, when the binarized coefficient does not include the second bin string, the inversely-binarized coefficient is less than or equal to the maximum code value of the truncated inverse binarization method, and when the binarized coefficient includes the first bin string and the second bin string, the inversely-binarized coefficient is greater than the maximum code value of the truncated inverse binarization method.

6. The apparatus of claim 5, wherein a frequency component of the coefficient is determined according to the position of the coefficient, and wherein the binarized coefficient is a discrete cosine transformation (DCT) coefficient generated by performing DCT on the residual block.

7. The apparatus of claim 6, wherein the inverse binarizer inversely binarizes discrete cosine transformation (DCT) coefficient based on the position of the DCT coefficient.

8. The apparatus of claim 7, wherein the inverse binarizer inversely binarizes the DCT coefficient using truncated binarization method of different maximum code value from a maximum code value of another DCT coefficient in the residual block.

\* \* \* \* \*